Nov. 22, 1949     P. J. MATHIEU     2,488,872
BELT FOR BELT CONVEYERS
Filed March 15, 1946     3 Sheets-Sheet 1
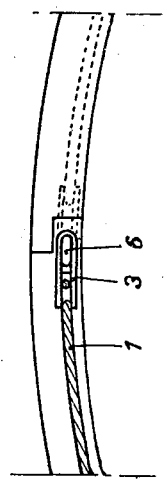
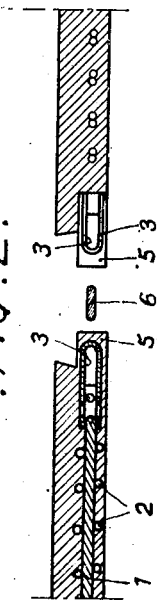
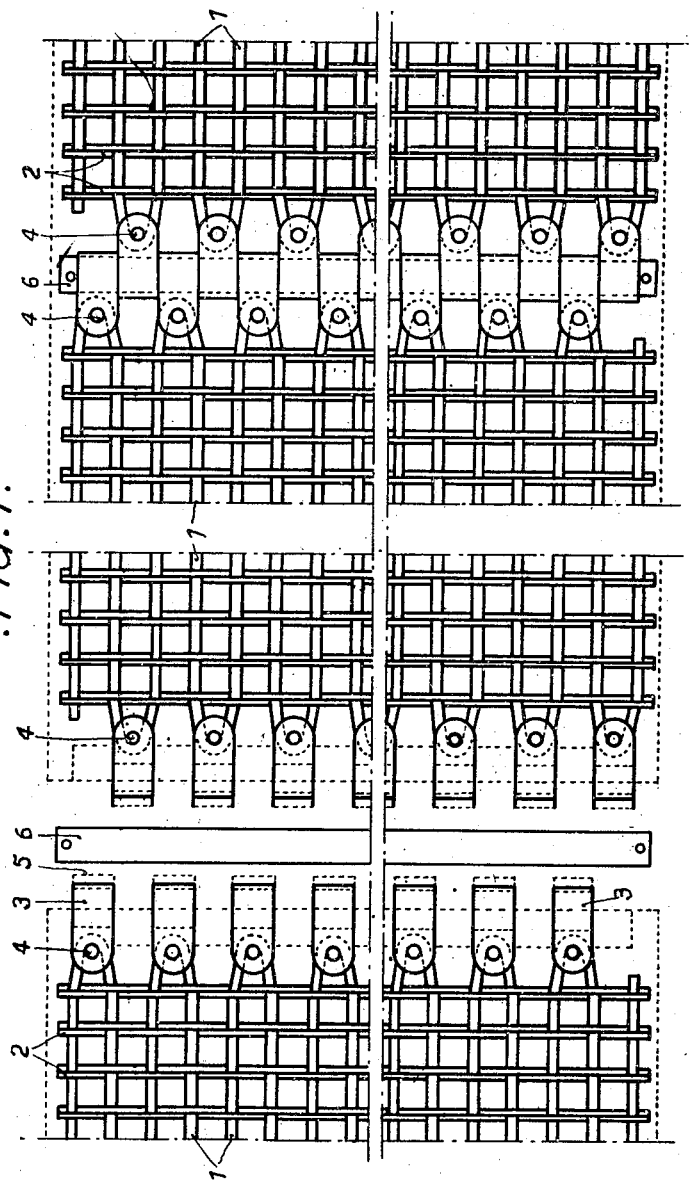
Inventor
PIERRE JULES MATHIEU, DECEASED,
BY S. B. MATHIEU, BORN LIZAMBARD,
WIDOW.

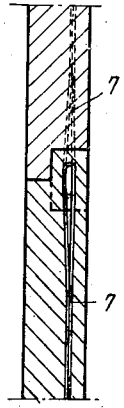
Fig. 5.
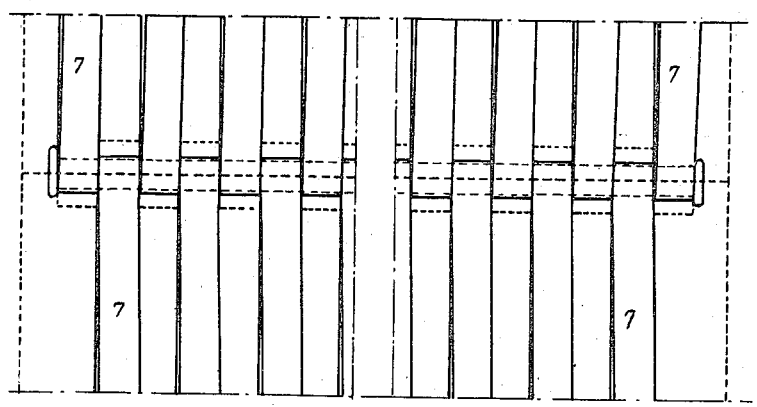
Fig. 4.
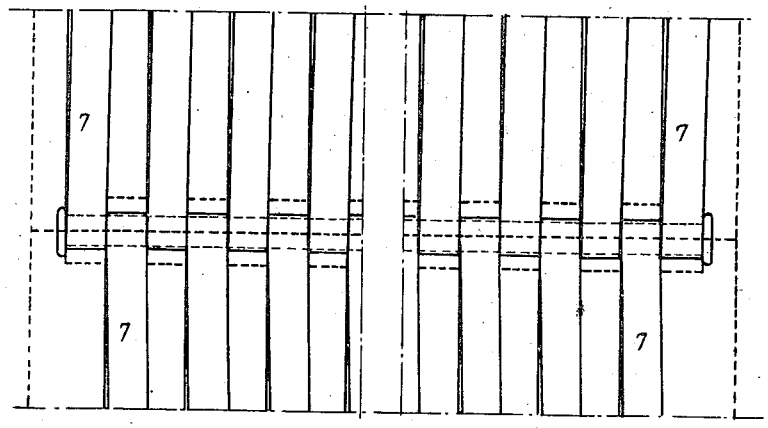
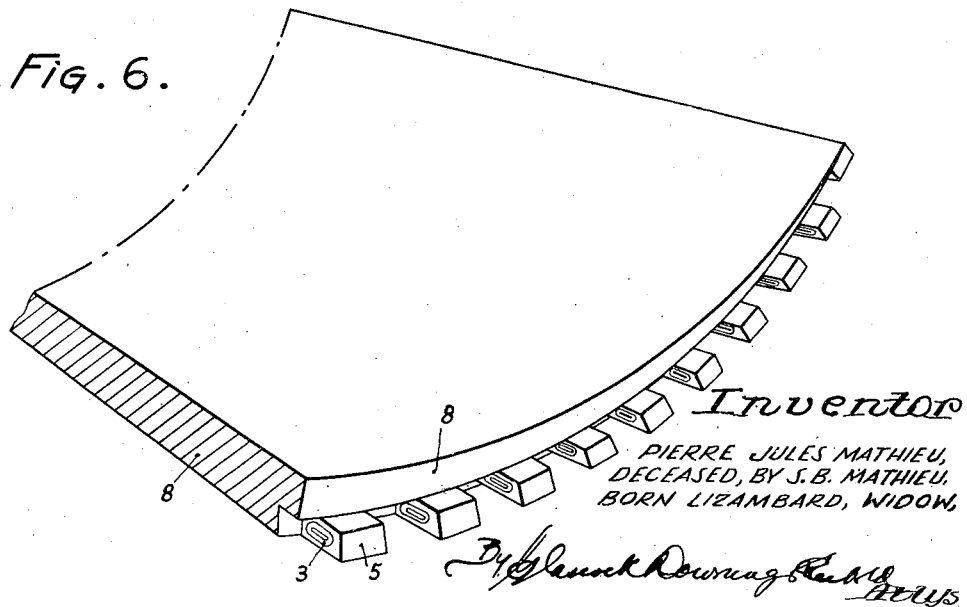
Fig. 6.
Inventor
PIERRE JULES MATHIEU,
DECEASED, BY S. B. MATHIEU,
BORN LIZAMBARD, WIDOW, Nov. 22, 1949   P. J. MATHIEU   2,488,872
BELT FOR BELT CONVEYERS
Filed March 15, 1946   3 Sheets-Sheet 3
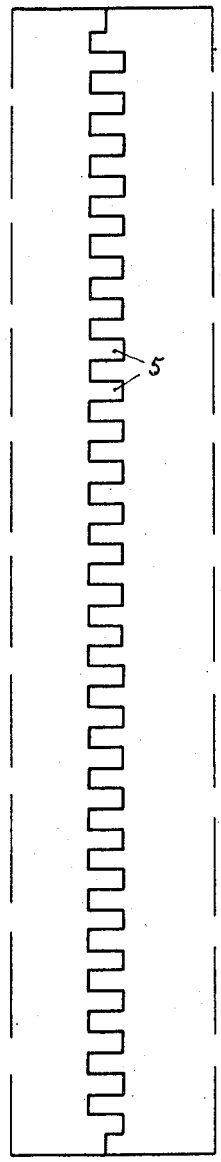
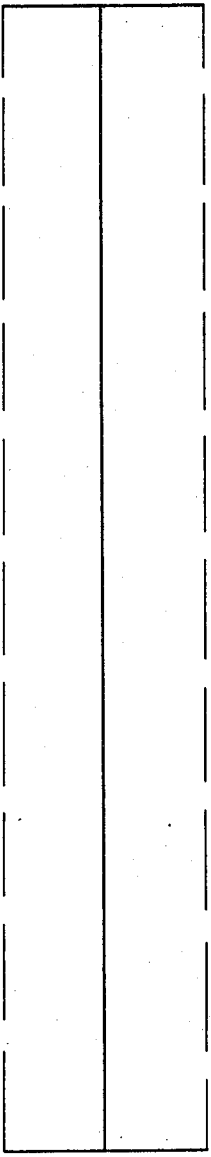
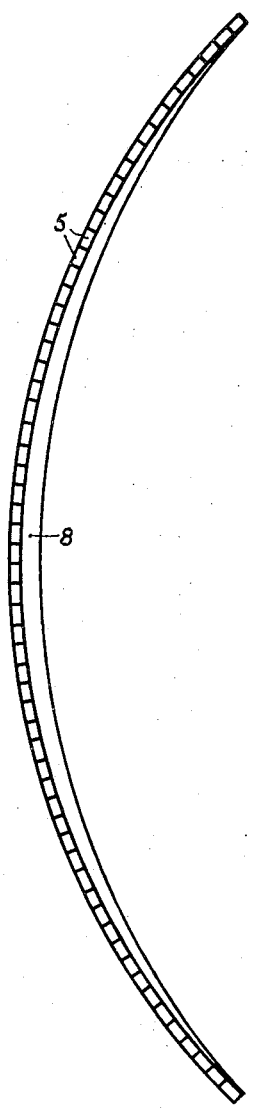
Inventor
PIERRE JULES MATHIEU,
DECEASED, BY S.B. MATHIEU,
BORN LIZAMBARD, WIDOW, Patented Nov. 22, 1949

2,488,872

UNITED STATES PATENT OFFICE 2,488,872

BELT FOR BELT CONVEYERS

Pierre Jules Mathieu, deceased, late of Rambouillet, France, by Suzanne Berthe Mathieu, born Lizambard, widow, Rambouillet, France, Suzanne Berthe Mathieu, heir at law of the estate of said Pierre Jules Mathieu, deceased Application March 15, 1946, Serial No. 654,750
In France May 16, 1945

3 Claims. (Cl. 198—193)

Belts used nowadays for transportation are generally constituted by the superposition of a plurality of canvas plies glued together and embedded inside a rubber-like material which protects them against moisture and damage due to the fall thereon of the material which is being transported.

These belts are executed in considerable lengths in accordance with the conditions of mounting corresponding to the desired application thereof, which leads to a number of drawbacks.

As a matter of fact, the belts follow often a difficult path; the repairs to be operated and the assembling of the parts to be interconnected are also difficult. Great difficulties are met with in the mounting and dismounting of the belt and whenever it is desired to modify their length.

The invention has for its object a conveyor belt adapted to remove such drawbacks.

This belt is chiefly constituted by elements of small length which may form standard elements and which are assembled together after the manner of the links of a chain.

Each element is constituted (a) By a part forming the force transmitting member of the strap and transmitting the tractional stress.

(b) By an upper wear-resisting layer, (c) By a lower force transmitting member protecting layer.

The force transmitting member may be constituted by threads or cables made of natural textile material such as cotton, silk or the like, of artificial textile material such as rayon, fibranne, nylon and the like, or else of metal wire of steel, brass and the like, or again of ribbons or plaits made of any of the above mentioned materials.

In the accompanying drawings has been shown by way of example, a form of execution according to the invention.

Fig. 1 is a plan view of said belt in the case of the force transmitting member being constituted by a cable.

Fig. 2 is a cross-section thereof corresponding to the left hand part of Fig. 1 and illustrating the zone of the joint between two adjacent elements, the joint being opened.

Fig. 3 is a cross-sectional view through the right hand side of Fig. 1 showing the joint between two adjacent elements.

Figs. 4 and 5 are a plan and a cross-sectional view of a modification of said form of execution according to which the force transmitting member is constituted by a metallic ribbon.

Fig. 6 is a perspective view of such a belt element.

Figs. 7, 8 and 9 are diagrammatic views illustrating respectively the belts seen cross-sectionally and views from above and below of the zone assembly.

In the form of execution illustrated in Figs. 1 to 3 the force transmitting member is constituted by a longitudinal cable 1 folded at each end of the elements into zig-zag formation and the strands of which are interconnected through transversal cables 2. The cable 1 at its folded ends passes through brass hooks 3 closed by a small pin 4 acting as a rivet. The continuous cable 1 passing successively from a hook at one end of the element to a hook at the other end forms with the interwoven transversal cables the force transmitting member of the elements the length of which may be for instance of the order of 1.50 m.

The metallic cables are first rendered adherent through any known means so as to provide for a perfect adherence of the rubber on to the metal. This force transmitting member arranged between two sheets of rubber of suitable thickness is then placed in a mold with a view to molding said element.

The hooks 3 at the ends of the belt element are embedded in the rubber teeth 5 formed at the end of the molded elements and separated by hollow portions adapted to receive the rubber teeth on the adjacent belt element.

For assembling the elements, there is provided a pivot constituted for instance by a metal blade 6 engaging the hooks 3 embedded in the rubber teeth or projections 5 fitting inside one another from one element to the other, the inside of said hooks remaining open and unobstructed throughout the width of the teeth. A stop at each end of the blade 6 prevents its lateral shifting.

In the form of execution illustrated in Figs. 4 and 5, the force transmitting member is constituted by a continuous metal strip 7 folded at each end so as to assume a zigzag formation; the loops formed by its folded ends themselves constitute hooks corresponding to the above mentioned hooks 3 and are embedded in the same manner in the rubber teeth projections formed in the molding at the terminal edges of the belt element. Said molding is executed in the same manner as in the preceding case.

As the belt is executed in elements of small length of the order of about 1.50 m. the presses and molds to be used are small sized. It is thus possible to mold the belt in its transversally incurved shape as illustrated in particular in Figs. 6 and 7, which will ensure a better behavior of the conveyor.

It may be of advantage to increase the transversal curvature and to provide a large sloping angle for the raising rollers. The output of the conveyor will be thus considerably increased.

It is also possible to give the mold a shape such that the thickness of the belt element may be considerable in its central portion (Fig. 6) and decreases then from said central portion towards the edges. Thus the rubber layer 8 is very large say three times thicker than in the case of a normal belt at its center, i. e. at the very points where the wear is the greatest. The life of the belt will thereby be much longer.

The longitudinal force transmitting member has a resistance which is calculated to provide for the most severe conditions of use and it allows operation of the belt in any case of application and consequently the elements which all are of identical length are interchangeable.

Fig. 7 is a cross-section of a belt according to the invention, molded into incurved shape.

Fig. 8 is a view of the belt seen from above; only the separation line 9—9a is apparent; Fig. 9 on the contrary shows the belt seen from below with the teeth of the two elements engaging one another.

By reason of the short length of the belt element, and consequently of the comparatively small size of the mold used for its execution, it is possible to reinforce the edges by a complementary rubber thickness which renders the elements less liable to be rapidly worn.

The advantages of the belt according to the invention are as follows:

(a) In case of an accident, the belt element which has been damaged may be replaced in a few minutes by a new element; the belt is always in perfect condition.

(b) No special care is required for assembling the elements which enter automatically into their alined position.

(c) The positioning of the belt is very easy, and no difficulty appears in the case where it is necessary to change a portion of the length of the conveyor.

(d) The elements, all of constant length, are interchangeable. As the user has in store spare elements, he may mount them on conveyors without taking into account the conditions of operation.

(e) The output of the conveyor is much larger for a belt of given width through the fact that the cross-section has a shape which is very incurved in the molding.

(f) The life of the belt is much longer by reason of the considerable thickness of rubber in its center and of the excellent distribution of the wearing layer.

(g) The belt may be obtained in mass production by the maker; no delay in the shipping of spare parts need be asked for.

(h) The rollers carrying the return strand are convex so that the belt may retain its incurved shape in said strand and prevent any transported products or extraneous bodies from resting thereon with the risk of engaging the gap between the drums and the belt and of damaging the latter; this reduces considerably the risk of damage, therefore eliminating the necessity of providing conventional side bars.

In ordinary usage the belt does not stretch. However, if in some exceptional cases the belt does stretch this stretching can be readily remedied by removing one of the elements.

The characteristic features of the invention which provide a certain advantage of the belt conveyors over the extant apparatuses are obviously applicable to all similar belts such as elevator belts and the like.

What is claimed is:

1. A conveyor belt comprising an endless succession of interchangeable elements of comparatively small length each including a force transmitting member embedded in a rubber envelope, each force transmitting member comprising a metallic continuous cable several times folded so as to form parallel longitudinal portions with loops at the end of the element and transverse bracing double wires intermeshed across said portions and assembling means consisting of hook shaped parts engaging the loops, rubber teeth provided at the ends of the envelope of each belt element in the moulding thereof and inside which the corresponding hook shaped parts are embedded while leaving the inner opening thereof open throughout the width of the teeth, the teeth at the cooperating ends of two adjacent belt elements being in an interengaging relationship and a removable transverse connecting blade adapted to engage the hook shaped parts at the ends of two adjacent force transmitting members, said parts being embedded in the corresponding teeth of the cooperating belt elements.

2. A conveyor belt as defined in and by claim 1, wherein each element is transversely convex in shape.

3. A conveyor belt as defined in and by claim 1, wherein each element is thicker throughout the longitudinal extent of its central portion than it is at its respective side edges.

SUZANNE BERTHE MATHIEU,
BORN LIZAMBARD,
*Widow of Pierre Jules Mathieu, Deceased.*

REFERENCES CITED

The following references are of record in the file of this patent:

UNITED STATES PATENTS

| Number | Name | Date |
|---|---|---|
| 344,563 | Channell | June 29, 1886 |
| 945,616 | Schwartz | Jan. 4, 1910 |
| 989,952 | Dodge | Apr. 18, 1911 |
| 1,211,350 | Price | Jan. 2, 1917 |
| 1,354,553 | Harter | Oct. 5, 1920 |
| 1,370,379 | Straub | Mar. 1, 1921 |

FOREIGN PATENTS

| Number | Country | Date |
|---|---|---|
| 129,780 | Great Britain | July 14, 1919 |
| 308,082 | Great Britain | Mar. 21, 1929 |

Certificate of Correction

Patent No. 2,488,872                                                     November 22, 1949

PIERRE JULES MATHIEU, DECEASED

It is hereby certified that error appears in the above numbered patent requiring correction as follows:

In the heading to the printed specification, line 9, foreign filing date, for "May 16, 1945" read *March 16, 1945*;

and that the said Letters Patent should be read with this correction therein that the same may conform to the record of the case in the Patent Office.

Signed and sealed this 11th day of April, A. D. 1950.

[SEAL]

THOMAS F. MURPHY,
*Assistant Commissioner of Patents.*